(12) United States Patent
Biancoli et al.

(10) Patent No.: US 7,073,658 B2
(45) Date of Patent: Jul. 11, 2006

(54) UNIT FOR FEEDING SOLID DRUG FORMS TO A CONVEYOR LINE OF A MACHINE FOR FILLING CAPSULES

(75) Inventors: Fabio Biancoli, Lido Di Classe (IT); Davide Frabetti, Baricella (IT)

(73) Assignee: MG 2 S.R.L, Pianoro (IT)

( * ) Notice: Subject to any disclaimer, the term of this patent is extended or adjusted under 35 U.S.C. 154(b) by 0 days.

(21) Appl. No.: 10/959,304

(22) Filed: Oct. 7, 2004

(65) Prior Publication Data
US 2005/0098410 A1 May 12, 2005

(30) Foreign Application Priority Data
Oct. 10, 2003 (IT) .......................... BO2003A0588

(51) Int. Cl.
*B65G 47/24* (2006.01)

(52) U.S. Cl. .......................... 198/757; 53/253; 53/251; 141/145; 141/242; 198/575

(58) Field of Classification Search ................ 198/575, 198/757; 53/253, 251; 141/145, 242
See application file for complete search history.

(56) References Cited

U.S. PATENT DOCUMENTS

| | | | | |
|---|---|---|---|---|
| 1,293,625 A | * | 2/1919 | Smith | 53/157 |
| 1,770,470 A | * | 7/1930 | Hartmann | 141/145 |
| 3,162,874 A | * | 12/1964 | Autio | 470/45 |
| 3,283,475 A | * | 11/1966 | Pinto | 53/250 |
| 3,912,123 A | | 10/1975 | Seragnoli | |
| 3,942,645 A | * | 3/1976 | Aronson | 209/545 |
| 4,150,751 A | * | 4/1979 | Romagnoli | 209/682 |
| 4,519,524 A | * | 5/1985 | Hirose | 221/167 |
| 4,782,644 A | * | 11/1988 | Haarer et al. | 53/282 |
| 5,101,612 A | | 4/1992 | Yamamoto et al. | |
| 5,234,099 A | * | 8/1993 | Berta | 198/867.15 |
| 5,474,092 A | * | 12/1995 | Moser et al. | 131/280 |
| 5,966,910 A | | 10/1999 | Ribani et al. | |

* cited by examiner

*Primary Examiner*—Gene O. Crawford
*Assistant Examiner*—Mark A. Deuble
(74) *Attorney, Agent, or Firm*—Berenato, White & Stavish LLC

(57) ABSTRACT

At least one solid drug form is fed into a capsule, housed inside a pocket on a first conveyor movable along an endless first path extending in a given first plane, by means of a seat on a second conveyor movable along an endless second path extending in a second plane parallel to the first plane; the seat receiving the solid form from a vibratory distributor plate, and releasing the solid form to the pocket.

11 Claims, 4 Drawing Sheets

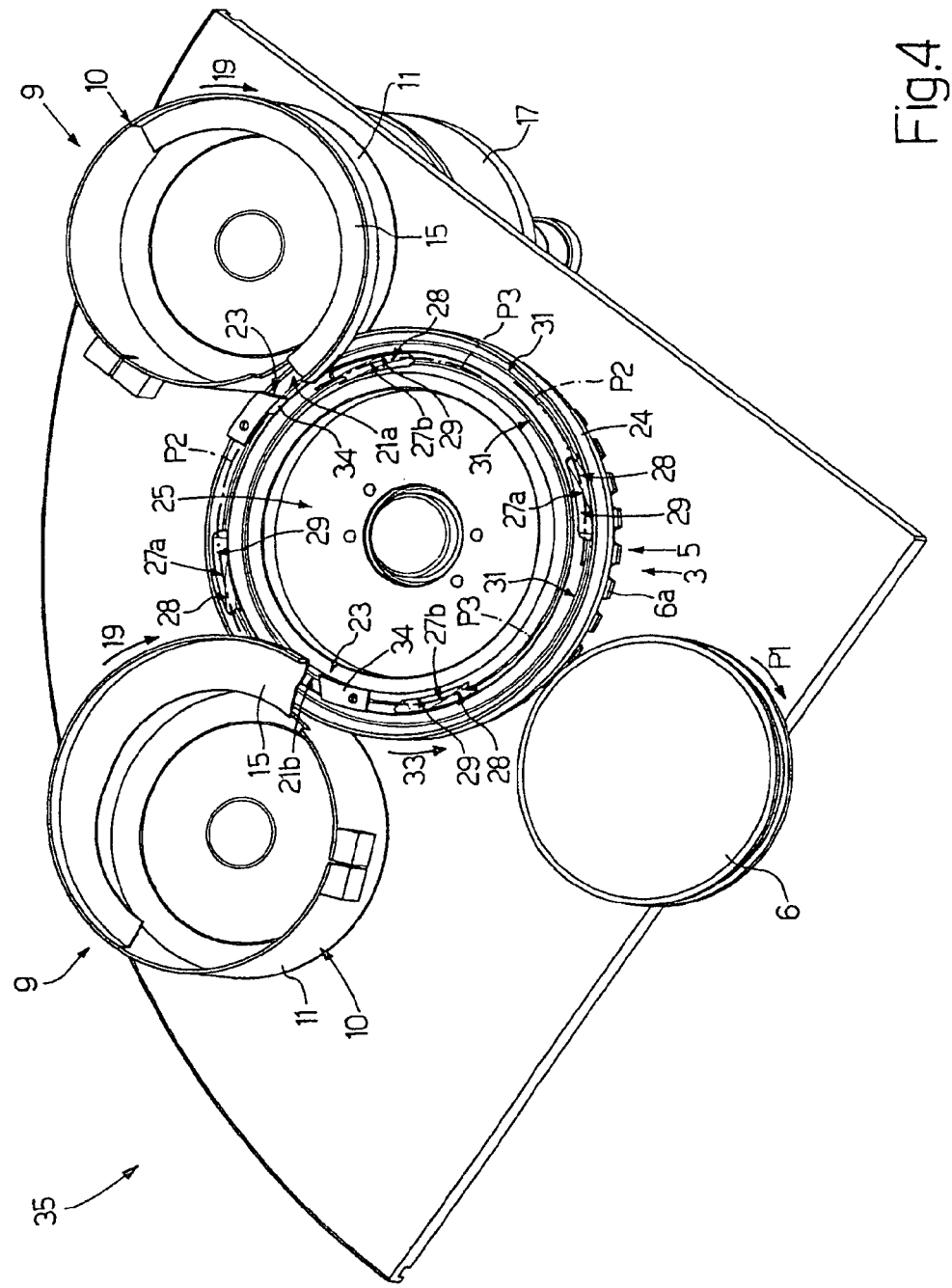

UNIT FOR FEEDING SOLID DRUG FORMS TO A CONVEYOR LINE OF A MACHINE FOR FILLING CAPSULES

The present invention relates to a unit for feeding solid drug forms to a conveyor line of a machine for filling capsules.

BACKGROUND OF THE INVENTION

In the drug industry, a capsule filling machine is known comprising a conveyor line, in turn comprising a chain conveyor having at least one pocket for a bottom shell of a capsule, and movable in steps to feed the pocket along an endless, substantially horizontal path through a feed station for feeding at least one solid drug form into the bottom shell.

The machine also comprises a feed unit for feeding the solid drug forms successively to the feed station, and which comprises a vibrating distributor plate; a hopper for feeding the solid forms onto the distributor plate; and a conveyor belt movable in steps in a vertical plane to feed the solid forms along a substantially straight second path extending between an input station for connection to the distributor plate, and an output station defined by said feed station.

Known capsule filling machines of the type described above have several drawbacks, mainly due to step operation of the chain conveyor and the conveyor belt resulting in a relatively low output rate of the machine.

SUMMARY OF THE INVENTION

It is an object of the present invention to provide a unit for feeding solid drug forms to a conveyor line of a capsule filling machine, designed to eliminate the aforementioned drawbacks.

According to the present invention, there is provided a unit for feeding solid drug forms to a conveyor line of a machine for filling capsules, the conveyor line comprising a feed station; and a first conveyor having at least one pocket for a bottom shell of a capsule, and movable to feed the pocket along an endless first path extending in a given first plane and through said feed station; the unit comprising a vibratory distributor plate; a hopper for feeding solid forms onto the plate; and a feed device comprising an input station for receiving the solid forms from the plate, and an output station defined by said feed station; and the unit being characterized in that the feed device comprises a second conveyor having at least one seat for at least one solid form, and movable to move the seat along a given endless second path extending in a second plane, parallel to the first plane, and through said input station and said feed station.

BRIEF DESCRIPTION OF THE DRAWINGS

A non-limiting embodiment of the present invention will be described by way of example with reference to the accompanying drawings, in which:

FIG. 4 is similar to FIG. 1, and shows a variation of the FIG. 1 unit.

DETAILED DESCRIPTION OF THE INVENTION

Figure 1:
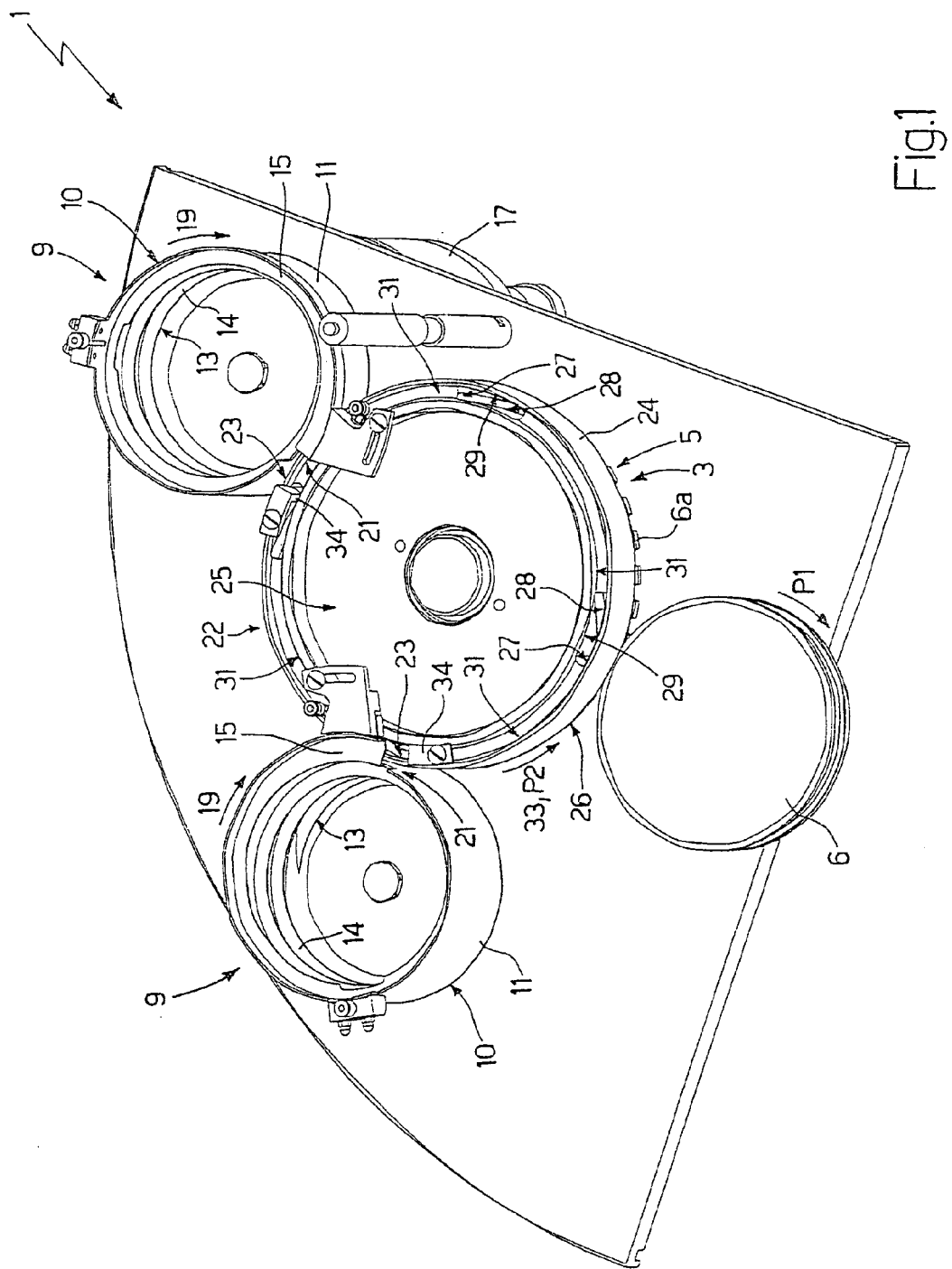
FIG. 1 shows a schematic view in perspective, with parts removed for clarity, of a preferred embodiment of the unit according to the present invention.
Figure 2:
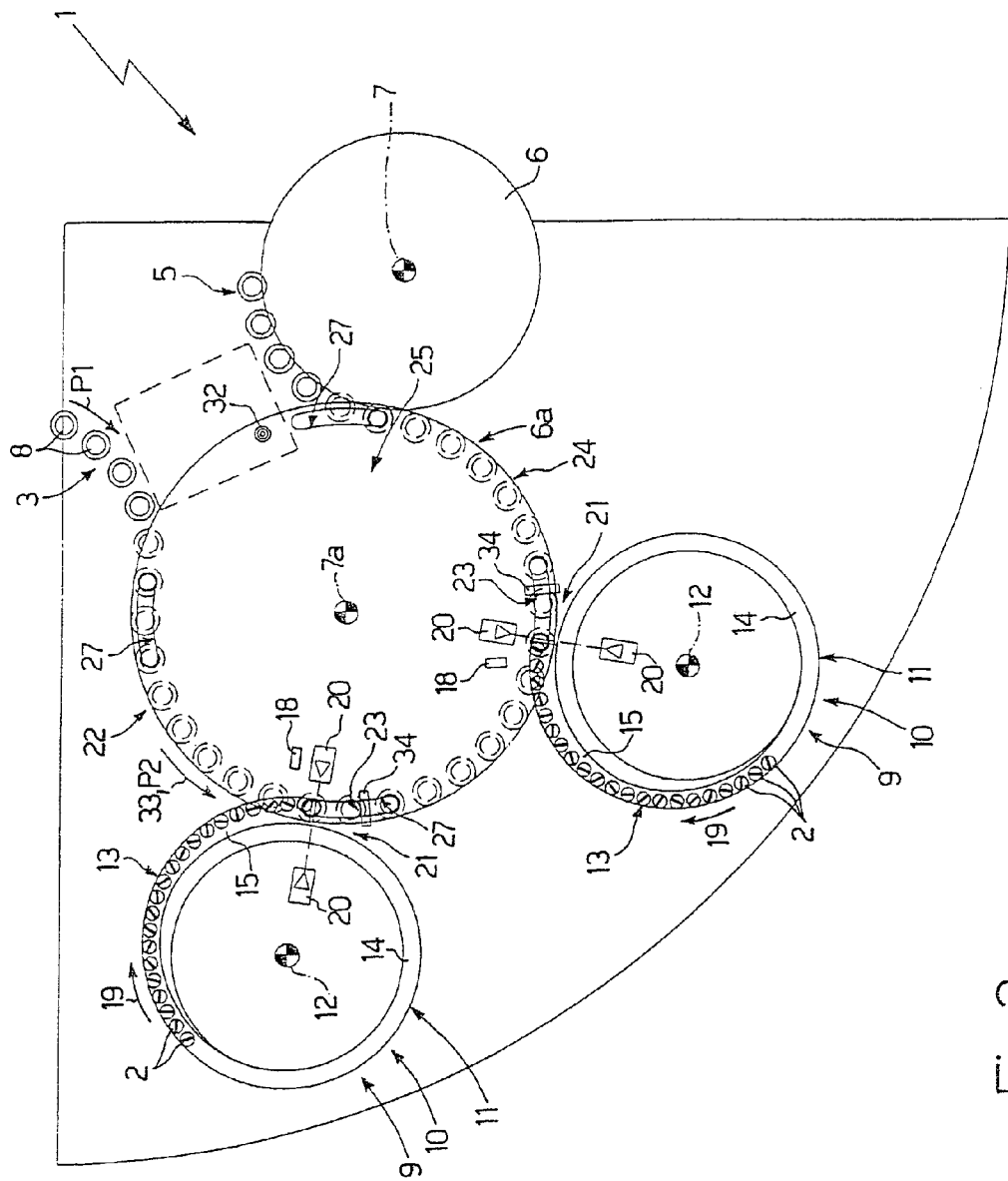
FIG. 2 shows a schematic plan view of the FIG. 1 unit.

With reference to FIGS. 1 and 2, number 1 indicates as a whole a unit for feeding solid drug forms 2 (in the example shown, tablets) to a conveyor line 3 of a machine for filling capsules (not shown), each comprising a substantially cup-shaped bottom shell 4 (FIG. 3), and a cover (not shown) fitted removably to bottom shell 4.

Line 3 comprises a chain conveyor 5 looped about a number of powered sprockets 6 connected to one another by a known gear transmission (not shown) to rotate continuously about respective substantially parallel vertical axes 7.

Figure 3:
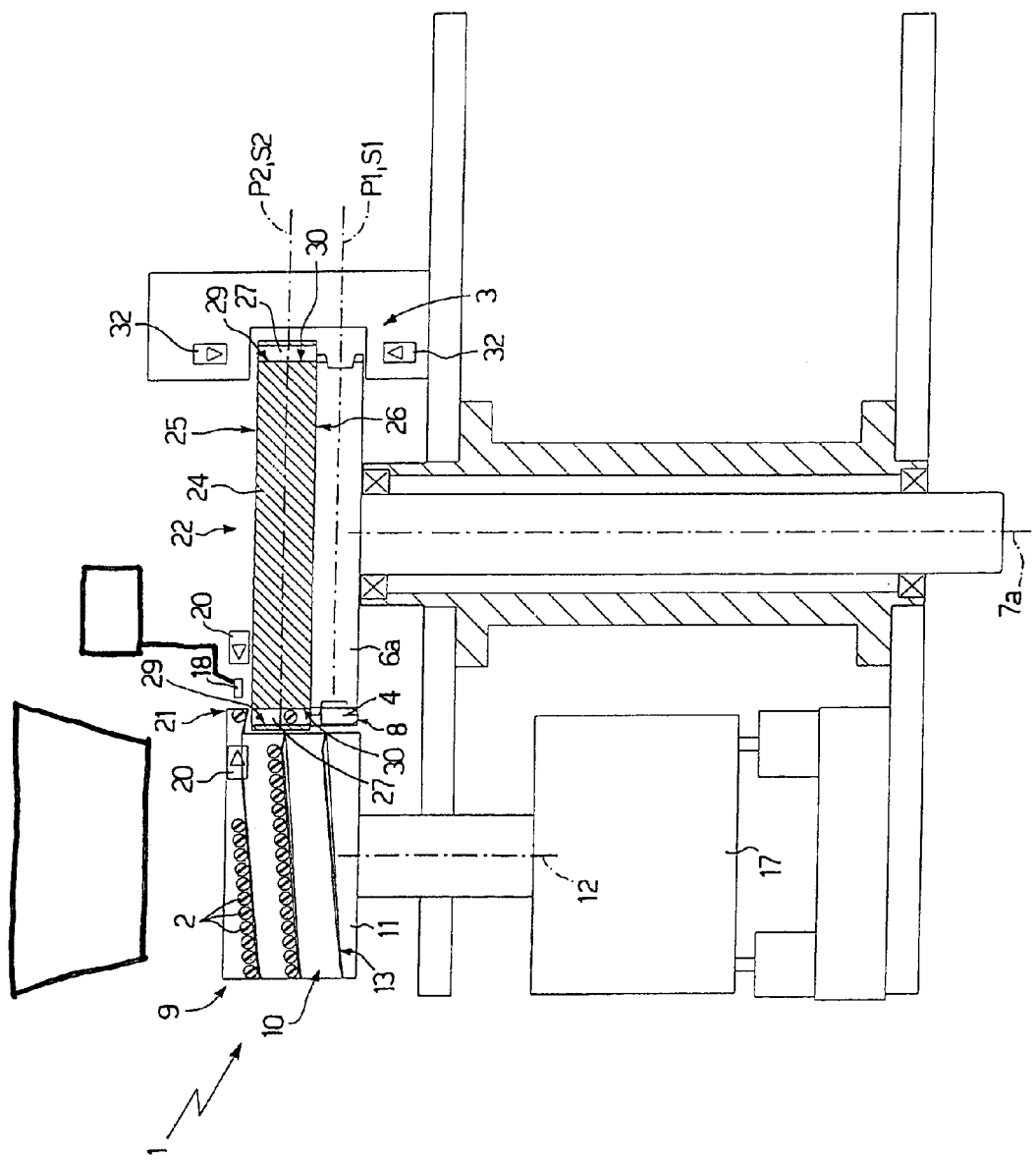
FIG. 3 shows a schematic side view, with parts in section and parts removed for clarity, of the FIG. 1 unit.

Conveyor 5 has a number of pockets 8, which are substantially cup-shaped with their concavities facing upwards, are equally spaced along conveyor 5 with a spacing p1, receive respective bottom shells 4 positioned with their concavities facing upwards, and are fed by conveyor 5 along an endless path P1 extending in a horizontal plane S1 (FIG. 3).

As shown in FIG. 2, unit 1 comprises, in the example shown, two feed assemblies 9 for supplying forms 2 and located along path P1.

Each assembly 9 comprises a distributor plate 10, in turn comprising a container 11, which is substantially cup-shaped with its concavity facing upwards, has a substantially vertical longitudinal axis 12 parallel to axes 7, and comprises a chute 13 coiling about and along axis 12, and in turn comprising a bottom input portion 14 projecting inwards from a lateral wall of container 11, and a top output portion 15 projecting outwards from the lateral wall of container 11.

Forms 2 are fed into container 11 by a hopper (not shown) located over plate 10, which is fixed to a vibrating base 17 for so vibrating plate 10 as to feed forms 2 along chute 13.

Plate 10 also has a pneumatic blowing device 18 located upstream from the output of chute 13 in the travelling direction 19 of forms 2 along chute 13, and which blows forms 2 off chute 13 and back into container 11; and a control device 20 defined, in the example shown, by a known optical sensor for detecting forms 2 issuing from chute 13.

To accurately determine the number of forms 2 issuing from chute 13, the distance between devices 18 and 20, measured parallel to direction 19, is obviously controlled selectively so as to be smaller than the dimension of form 2, also measured parallel to direction 19.

At a transfer station 21 at the output of chute 13, forms 2 are transferred to a distributor device 22, which is normally common to both assemblies 9, and provides for feeding forms 2 into relative pockets 8 and therefore into relative bottom shells 4 at a feed station 23 located along path P1.

Device 22 comprises a substantially cylindrical drum 24, which is mounted over one of sprockets 6 (hereinafter indicated 6a) coaxially with relative axis 7 (hereinafter indicated 7a), is connected in angularly and axially fixed manner to sprocket 6a to rotate continuously about axis 7a, and is bounded axially by a top surface 25 and a bottom surface 26, both substantially perpendicular to axis 7a.

Drum 24 has a number of—in the example shown, four—distribution channels 27, which are equally spaced about axis 7a, are formed through drum 24 so as to open out at surfaces 25 and 26, and are fed by drum 24 along an endless path P2 extending about axis 7a and through stations 21 and 23.

Each channel 27 tapers downwards, is bounded at the bottom by a substantially paraboloidal bottom wall 28, has a top inlet 29 extending about axis 7a, and has a substantially circular bottom outlet 30 smaller in cross section than inlet 29 and which is advanced by drum 24 in time with a relative pocket 8.

In connection with the above, it should be pointed out that outlets 30 are equally spaced about axis 7a with a spacing p2 which is a whole multiple of spacing p1 of pockets 8.

Drum 24 also has a number of grooves 31, which are formed in surface 25, are equal in number to channels 27, extend between channels 27 and about axis 7a, and are advanced by drum 24 along path P2 and through stations 21 and 23.

Finally, device 22 comprises a control device 32 located along path P2, downstream from stations 23 in the travelling direction 33 of channels 27 along path P2, and which comprises, in the example shown, a known optical sensor for determining correct operation of channels 27, i.e. the absence of forms 2 inside channels 27, and a pneumatic blowing device for expelling forms 2 jammed inside channels 27, in response to a signal from said optical sensor. Any forms 2 jammed inside channel 27 are expelled by feeding an air jet along an exhaust conduit (not shown) formed through drum 24 so as to form an angle of other than 90° with surfaces 25 and 26, and to communicate with bottom outlet 30 of channel 27.

Operation of unit 1 will now be described with reference to FIG. 2 and only one assembly 9, bearing in mind that bottom shells 4 are only fed, in known manner, into pockets 8 spaced apart by a distance equal to spacing p2, bearing in mind that forms 2 are fed successively by vibration of distributor plate 10 along chute 13 to station 21, and as of the instant in which inlet 29 of a distribution channel 27 begins travelling through transfer station 21.

As inlet 29 of the channel 27 considered travels through station 21, pneumatic blowing device 18 is activated to prevent forms 2 reaching station 21, and to blow them back into container 11.

When inlet 29 of the channel 27 considered is located downstream from station 21 in direction 33, device 18 is deactivated by an electronic central control unit (not shown) to allow a given number of forms 2 to reach station 21 and fall by gravity into the groove 31 located upstream, in direction 33, from the channel 27 considered.

Once control device 20 detects the passage of a given number of forms 2 through station 21, device 18 is reactivated by the electronic central control unit (not shown) in response to a signal from device 20, to prevent any more forms 2 from travelling through station 21.

The forms 2 which have dropped into the groove 31 considered are fed by drum 24 in direction 33 into contact with a fixed stop member 34 located at feed station 23, extending crosswise to path P2, and for arresting travel of forms 2 in direction 33. The forms 2 considered are thus retained in station 23 by member 34, and engage relative groove 31 in sliding manner until inlet 29 of another channel 27 reaches station 23.

At this point, the forms 2 considered drop by gravity into and along the other channel 27, and are therefore fed into relative pocket 8 and, hence, relative bottom shell 4. In this connection, it should be pointed out that the paraboloidal shape of bottom wall 28 of channel 27 prevents impact and/or rebound of forms 2 inside channel 27, i.e. prevents any phenomena which might jam and/or slow down fall of forms 2 along channel 27.

Alternatively, operation of the assembly 9 considered may be controlled to deactivate device 18 as inlet 29 of a channel 27 travels through station 21, and to reactivate device 18 in response to a signal from device 20 following the passage of a given number of forms 2 through station 21.

Using two assemblies 9, each bottom shell 4 can be fed with more forms 2 than using only one assembly 9, or may be fed with two different types of forms 2 housed in respective hoppers.

Unit 1 therefore has various advantages, mainly due to chain conveyor 5 and drum 24 being operated continuously and so enabling a relatively high output rate of unit 1.

The FIG. 4 variation relates to a feed unit 35 which differs from unit 1 in that:

the four channels 27 are divided into two pairs of channels 27;

the channels 27 (hereinafter indicated 27a) in one pair of channels 27 are movable along path P2, and the channels 27 (hereinafter indicated 27b) in the other pair of channels 27 are movable along a path P3 coaxial with and located inwards of path P2; and the top output portions 15 of the two chutes 13, and therefore the two transfer stations 21, are offset radially with respect to axis 7a, so that one station 21 (hereinafter indicated 21a) is located over path P2, and the other station 21 (hereinafter indicated 21b) is located over path P3.

Unit 35 is particularly advantageous when bottom shells 4 are all fed with the same type of form 2. That is, since each distributor plate 10 only supplies two channels 27, drum 24 of unit 35 can be rotated about axis 7a at a higher rotation speed than drum 24 of unit 1.

The output rate of unit 35 may obviously be further increased by forming more than two channels 27a and 27b.

The invention claimed is:

1. A unit for feeding solid drug forms (2) to a conveyor line (3) of a machine for filling capsules, the conveyor line (3) comprising a feed station (23); and a first conveyor (5) having at least one pocket (8) for a bottom shell (4) of a capsule, and movable to feed the pocket (8) along an endless first path (P1) extending in a given first plane (S1) and through said feed station (23); the unit comprising a vibratory distributor plate (10); a hopper for feeding solid forms (2) onto the plate (10); and a feed device (22) comprising an input station (21) for receiving the solid forms (2) from the plate (10), an output station for feeding at least one solid form (2) to said feed station (23), and a second conveyor (24) having at least one seat (27) for the solid form (2), and movable to move the seat (27) along a given endless second path (P2) extending in a second plane (S2), parallel to the first plane (S1), and through said input station and said output station; wherein the plate (10) comprises a cup-shaped container (11) for a number of solid forms (2), the container (11) having a given longitudinal second axis (12), and having a feed track (13) coiling about and along said second axis (12) to feed the solid forms (2) successively to said input station (21); wherein recirculating means (18) are located upstream from said input station (21) in a first travelling direction (19) of the solid forms (2) along said track (13), to transfer the solid forms (2) from the track (13) to said container (11); and wherein logic control means are provided for deactivating said recirculating means (18) when the seat (27) is located downstream from said input station (21) in a second travelling direction (33) of the seat (27) along said second path (P2).

2. A unit as claimed in claim 1, and also comprising actuating means (6) for moving said first and said second conveyor (5, 24) continuously along said first and said second path (P1, P2) respectively.

3. A unit as claimed in claim 1, wherein said second conveyor (24) comprises a drum (24) mounted to rotate about a given longitudinal first axis (7*a*), and at least one feed channel (27) formed through said drum (24) to define said seat (27); the feed channel (27) having an inlet (29) for receiving said solid form (2), and an outlet (30) for releasing the solid form (2) to said pocket (8).

4. A unit as claimed in claim 3, wherein the inlet (29) has an inlet surface larger than an outlet surface of said outlet (30).

5. A unit as claimed in claim 3, wherein said feed channel (27) is bounded at the bottom by a substantially paraboloidal bottom surface (28).

6. A unit as claimed in claim 3, wherein the drum (24) is bounded at the top by a surface (25) having a groove (31) winding about said first axis (7*a*), movable through said input station (21), and for receiving said solid form (2) at the input station (21).

7. A unit as claimed in claim 6, and also comprising stop means (34) located at said feed station (23) to engage and prevent the solid form (2) engaged in said groove (31) from travelling along said second path (P2).

8. A unit as claimed in claim 1, wherein said recirculating means (18) are pneumatic recirculating means (18).

9. A unit as claimed in claim 1, and also comprising sensor means (20) located at said input station (21) to detect the passage of a given number of solid forms (2) through said input station (21); the recirculating means (18) being activated in response to a signal from said sensor means (20).

10. A unit as claimed in claim 1, and also comprising control means (32) located downstream from said feed station (23) in said second travelling direction (33) to determine the absence of solid forms (2) in the seat (27).

11. A unit as claimed in claim 1, and comprising two plates (10); an input station (21) for connecting each plate (10) to said feed device (22); and at least two seats (27), one (27*a*) movable along said second path (P2), and the other (27*b*) movable along an endless third path (P3) which extends in said second plane (S2) and is parallel to the second path (P2); said input stations (21) being located one (21*a*) over the second path (P2), and the other (21*b*) over the third path (P3).

* * * * *